US009367744B2

(12) United States Patent
Wang et al.

(10) Patent No.: US 9,367,744 B2
(45) Date of Patent: *Jun. 14, 2016

(54) SYSTEMS AND METHODS OF FINGERPRINTING AND IDENTIFYING MEDIA CONTENTS

(71) Applicant: Vobile, Inc, Santa Clara, CA (US)

(72) Inventors: Yangbin Wang, Palo Alto, CA (US); Lei Yu, Hangzhou (CN)

( * ) Notice: Subject to any disclaimer, the term of this patent is extended or adjusted under 35 U.S.C. 154(b) by 211 days.

This patent is subject to a terminal disclaimer.

(21) Appl. No.: 14/165,547

(22) Filed: Jan. 27, 2014

(65) Prior Publication Data

US 2014/0140682 A1 May 22, 2014

Related U.S. Application Data

(63) Continuation-in-part of application No. 11/679,819, filed on Feb. 27, 2007, now Pat. No. 8,689,337.

(51) Int. Cl.
| | |
|---|---|
| *G06F 17/30* | (2006.01) |
| *H04N 7/16* | (2011.01) |
| *G06K 9/00* | (2006.01) |
| *H04N 21/254* | (2011.01) |
| *H04N 21/426* | (2011.01) |
| *H04N 21/44* | (2011.01) |
| *H04N 21/442* | (2011.01) |
| *H04N 21/835* | (2011.01) |
| *G11B 20/00* | (2006.01) |

(52) U.S. Cl.
CPC ...... *G06K 9/00711* (2013.01); *G11B 20/00884* (2013.01); *H04N 21/2541* (2013.01); *H04N 21/42646* (2013.01); *H04N 21/44008* (2013.01); *H04N 21/44236* (2013.01); *H04N 21/835* (2013.01); *G11B 20/0021* (2013.01); *G11B 20/00086* (2013.01); *G11B 20/00449* (2013.01)

(58) Field of Classification Search
CPC .............. G06F 21/10; G11B 20/00086; G11B 20/0021; H04L 63/0428; H04N 21/4405
USPC .......... 713/168–174, 182–186, 202; 709/225, 709/229; 726/2–8, 26
See application file for complete search history.

(56) References Cited

U.S. PATENT DOCUMENTS

2011/0167004 A1* 7/2011 Zank ....................... G06F 21/64
705/64

* cited by examiner

*Primary Examiner* — Evans Desrosiers

(57) ABSTRACT

Systems and methods are provided for identifying a video object using digital fingerprints. The digital fingerprints are generated from information extracted from the video object including encoded video. The digital fingerprints can be calculated in a manner that permits identification of both the video object and operational characteristics of the video object based on matching calculated digital fingerprints with known fingerprints of known video objects. Systems and methods are described that allow a DVD to be uniquely identified and identify whether the DVD is original, copied or pirated. Systems and methods are described for computing digital fingerprints from strings of bits in which certain additional data is optionally embedded. Systems and methods are described that permit media players to access known signatures of known video objects maintained on one or more databases and to identify video objects presented for playing on the media player. In the present continuation application, the video object is extended to media content including video and audio, and DVD is extended to media file, network stream and other content mediums.

20 Claims, 3 Drawing Sheets

Construction of String-1 and String-2

Construction of String-3

SYSTEMS AND METHODS OF FINGERPRINTING AND IDENTIFYING MEDIA CONTENTS

CROSS-REFERENCE TO RELATED APPLICATIONS

The present application is a Continuation-in-Part of U.S. application Ser. No. 11/679,819, filed Feb. 27, 2007, entitled "SYSTEMS AND METHODS OF FINGERPRINTING AND IDENTIFYING VIDEO OBJECTS" and which is incorporated herein by reference and for all purposes.

BACKGROUND OF THE INVENTION

1. Field of the Invention

The present invention relates generally to techniques for fingerprinting and identifying media contents including Digital Versatile Discs (DVD), and more particularly to methods and apparatus for generating multiple content-based IDs or fingerprints and using these fingerprints to uniquely identify a media content including DVD.

2. Description of Related Art

The Digital Versatile Disc (DVD) has become very popular in the past decade thanks to the ubiquitous low-cost DVD players as well as the availability of video content on DVDs. According to DVD Entertainment Group, by the end of 2005, more than 80% of US household will have at least one DVD player. Meanwhile, more than 70,000 DVD titles have been published for Region 1 (US and Canada) since 1997. The increasing number of published DVD titles and the proliferation of digital media jukeboxes and online services demand effective and efficient methods and apparatus for indexing and uniquely identifying a DVD disc.

A digital object can be uniquely identified. Here the term "digital object" is defined as a digital file or bitstream, or a composition of multiple digital files or bitstreams. For example, digital objects can include a computer file stored on a hard disc drive and video bitstreams broadcast or streamed to a TV or computer. A DVD or more precisely the content on a DVD can also be characterized as a digital object comprising multiple files stored on the DVD disc. The structure, format and organization of content on DVDs is described in "DVD Specifications for Read-Only Disc, Part 3: Video Specifications," Version 1.1, December 1997, published by the DVD Forum. As is known in the art, a digital object can be uniquely identified by passing the object through a hash function that produces a fixed-length output known as hash sum or message digest. A hash sum of a digital object is often called a digital fingerprint because it can be used to uniquely identify the digital object. A popular hash function that is often used to generate digital fingerprint of a digital object is the RFC 1321 specified MD5 hash function. Hereinafter, the term "fingerprint" will be used interchangeably with the term "digital fingerprint."

While it is useful to fingerprint a DVD by passing all of its data through a hash function such as the MD5 hash function, a fingerprint so generated is often inadequate for advanced identification tasks. For example, a pirated DVD will have a MD5 hash sum that is completely different from that of the original DVD, and the hash sum of the pirated DVD may appear to have no relationship to the hash sum of the original DVD. Similarly, a DVD containing a wide-screen version of a movie may not be easily related to a DVD containing the full-screen version of the same movie because their MD5 hash sums are different. Thus to be able to distinguish a pirated DVD from the original or one version of a movie from another, a more sophisticated method and apparatus for fingerprinting and identifying DVDs is required.

BRIEF SUMMARY OF THE PARENT INVENTION

Certain embodiments of the invention provide systems and methods for associating a video object with digital fingerprints. The digital fingerprints can facilitate identification of the video object and operational characteristics of the video object based on matching calculated digital fingerprints with known fingerprints of known video objects. In certain embodiments, a match of some but not all of the calculated fingerprints may indicate that the video object is a copied or pirated version of an original video object.

Certain embodiments comprise systems and methods for obtaining fingerprints using a process that supports advanced identification capabilities. Fingerprints of a DVD can be obtained that allow the DVD to be uniquely identified and that may reveal certain aspects of the DVD. Certain data can be selectively added or removed from data extracted from the video object and used to calculate digital signatures such that absence or presence of the certain data embeds additional information into digital signatures. By generating multiple fingerprints having different embedded information, a plurality of characteristics and aspects of the DVD can be identified including origin of the DVD and operating characteristics of the DVD.

In certain embodiments, computation of a fingerprint comprises collecting of a string of bits and calculating a digital fingerprint from the string of bits where the fingerprint can be in the form of a hash sum, for example. In certain embodiments, playback devices or media players can access known signatures of known video objects maintained on one or more databases. The playback devices can receive a video object for playing and can identify the video object by calculating a plurality of digital fingerprints from the video object and comparing those objects to known signatures of known objects. Typically, the video object can be identifying by matching one or more signatures derived from video data encoded in the video object and can determine origin of the video object based on matching other digital signatures calculated from data extracted from the video object. The ability to determine information other than identity is akin to the ability to identify which finger or thumb cast a distinct fingerprint that can uniquely identify the person leaving the fingerprint.

DETAILED DESCRIPTION OF THE PARENT INVENTION

Figure 1:
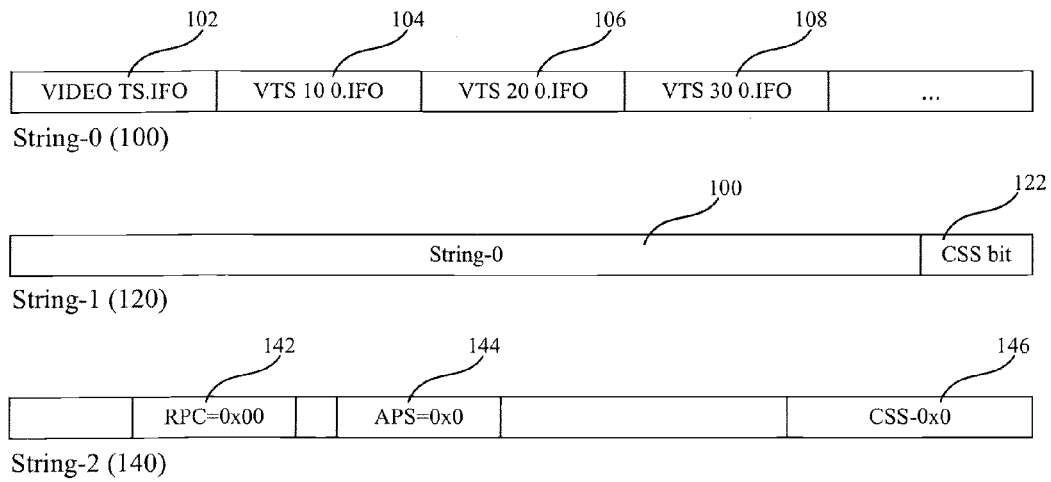
FIG. 1 illustrates the construction of two strings of bits to be hashed or fingerprinted in a specific embodiment according to the present invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods for associating a video object with multiple fingerprints that facilitate identification of the video object. Certain embodiments comprise systems and methods for obtaining fingerprints using a process that supports advanced identification capabilities. In one example, fingerprints of a DVD can be obtained that allow the DVD to be uniquely identified and that may reveal certain aspects of the DVD. According to certain aspects of the invention, additional information can be embedded into certain of a plurality of fingerprints generated for the DVD such that each of the fingerprints is unique. Certain data can be selectively added or removed from data extracted from the video object and used to calculate digital signatures such that absence or presence of the certain data embeds additional information into digital signatures. By generating multiple fingerprints that embed different or additional information in signatures of a DVD a plurality of characteristics and aspects of the DVD can be identified. Certain embodiments of the present invention enable applications to uniquely identify a DVD disc upon insertion into a DVD drive, and determine the origins and/or provenance of the inserted DVD disc including determining whether the inserted DVD is an original, a copy of an original, or a pirated copy of an original and/or whether the DVD is an edition that contains a known feature or attribute.

Fingerprinting Video Objects

In certain embodiments, computation of a fingerprint comprises collecting of a string of bits and calculating a digital fingerprint from the string of bits. In certain embodiments, the digital fingerprint is calculated by passing the string to a hash function to obtain the hash sum. Certain embodiments provide novel methods for constructing the strings of bits to be hashed or fingerprinted. In the example of a DVD discussed above, at least one constructed string can contain unaltered information that is directly extracted from the DVD disc. A base string (String-0) may be constructed from unaltered information extracted from a DVD, while a plurality of additional strings (String-N, where N=1, 2, 3 . . . ) may be constructed to contain altered information derived from the DVD disc. Thus, a string can be constructed from information extracted from a DVD to which certain bits may be added, removed or altered. Various alternate and complementary methods for constructing strings and generating fingerprints are contemplated to be within the scope of the present invention, although only a few examples will be presented for discussion herein.

Figure 2:
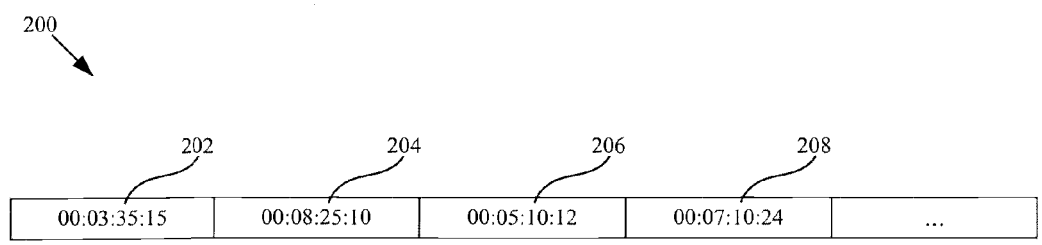
FIG. 2 illustrates the construction of another string of bits to be hashed or fingerprinted in a specific embodiment according to the present invention.

In one example, illustrated in FIGS. 1 and 2, a base string (String-0) 100 may be constructed by concatenating all information ("IFO") files 102, 104, 106 and 108 that are found on a DVD disc. Next, String-1 120 can be constructed such that it contains String-0 100 followed by one or more bits 122 including bits that identify operational characteristics of the DVD such as bits indicating whether a DVD disc is encrypted using the Content Scrambling System ("CSS"). In certain embodiments, String-2 140 may be constructed using a masked version of String-1 120 and can include additional information and can mask certain information, including, for example, bits that identify the states of Region Protection Code ("RPC") 142, CSS 146, and Analog Protection System ("APS") 144. Masking typically causes masked bits to be cleared to zero or set to one.

More specifically, String-1 100 in the example includes the IFO files 102, 104, 106, 108 that can completely characterize the navigational structure of a DVD, and a CSS bit 120 that characterize the encryption state of the DVD. Therefore, a fingerprint generated from String-1 120 can uniquely identify the DVD. A fingerprint generated from String-2 140 can typically be identically generated from original, copied and pirated DVDs because the use of masked copies of RPC 142, CSS 146 and APS 144 typically renders the fingerprint invariant to modifications to RPC, CSS, and APS states that tend to be indicative of a pirated DVD disc.

In certain embodiments, fingerprints can be generated from information that identifies intrinsic characteristics of video objects. In one example, String-0 100, String-1 120, and String-2 140 can be constructed from a DVD as described above. In addition, a String-3 200 may be constructed by concatenating the playtime codes 202, 204, 206 and 208 of all chapters contained in the main feature title of the DVD. The playtime code 202, 204, 206 and 208 of a title or its chapter can be computed by parsing the IFO files of the DVD according to the DVD specifications. Since String-3 200 is constructed from the theatrical time structure of the content and are not directly representative of the bits stored on the DVD disc, the fingerprint that is generated from String-3 is typically invariant with respect to the screen format (aspect ratio) of the content (e.g., widescreen vs. full-screen), and other characteristics.

In another example, String-0 100, String-1 120, and String-2 140 can be constructed for a DVD as described in the previous examples. Additional strings can be constructed such that each additional string corresponds to a different title found in the DVD disc. More specifically, each additional string can be constructed by concatenating the playtime code of a unique title in the DVD disc.

The process of fingerprinting DVDs results in multiple fingerprints for each DVD. These fingerprints can be stored in a database or other repository along with information about the corresponding DVD. The fingerprints may be stored and/or maintained in a repository or database that is provided in local storage or on a network server. Since DVD are primarily used as a read-only disc (except during writing in DVD-RW, etc), all copies of the same DVD title will typically have one or more identical fingerprints.

Identifying a DVD

Figure 3:
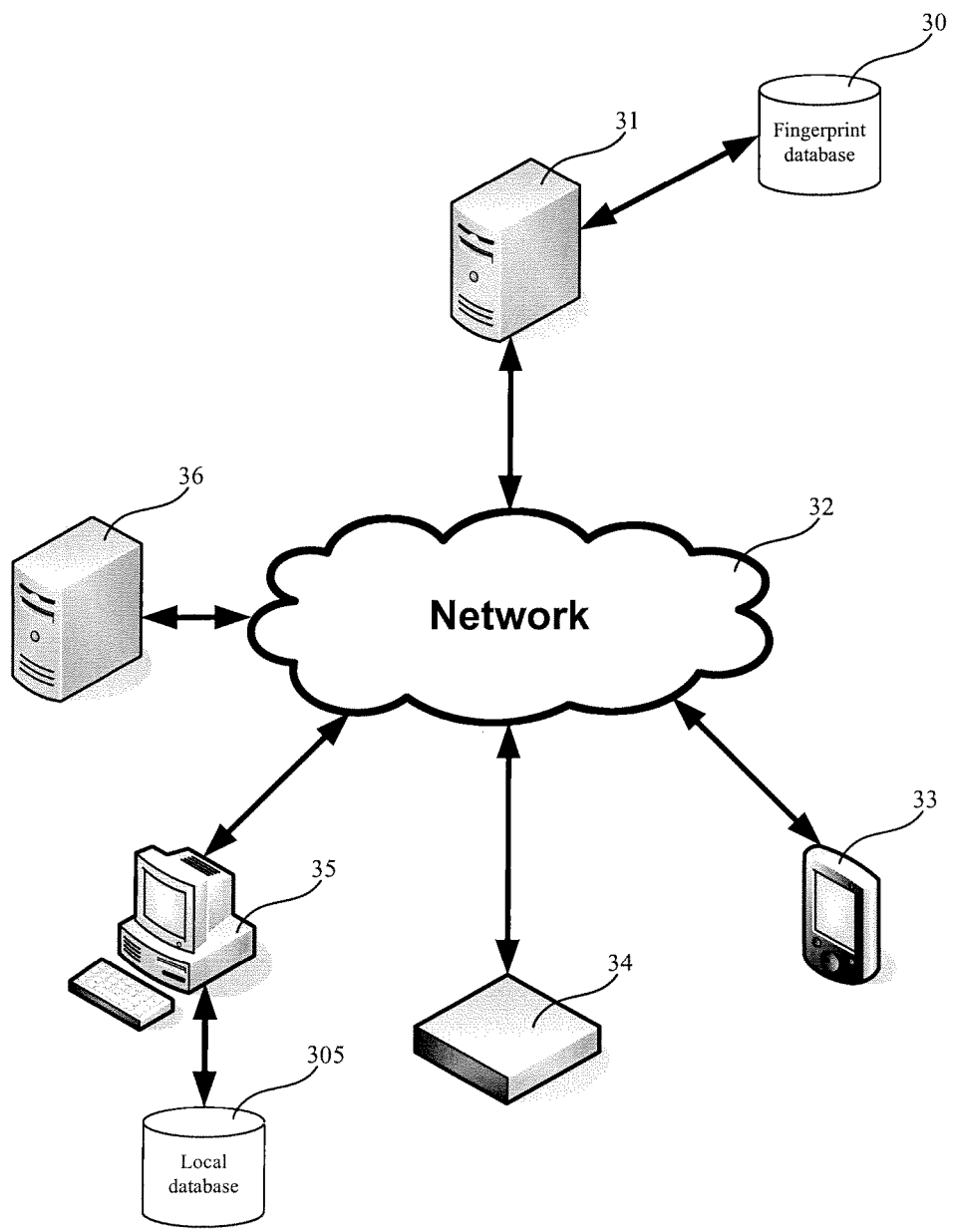
FIG. 3 is an abstracted diagram of an apparatus for DVD fingerprint matching and identification.
Figure 4:
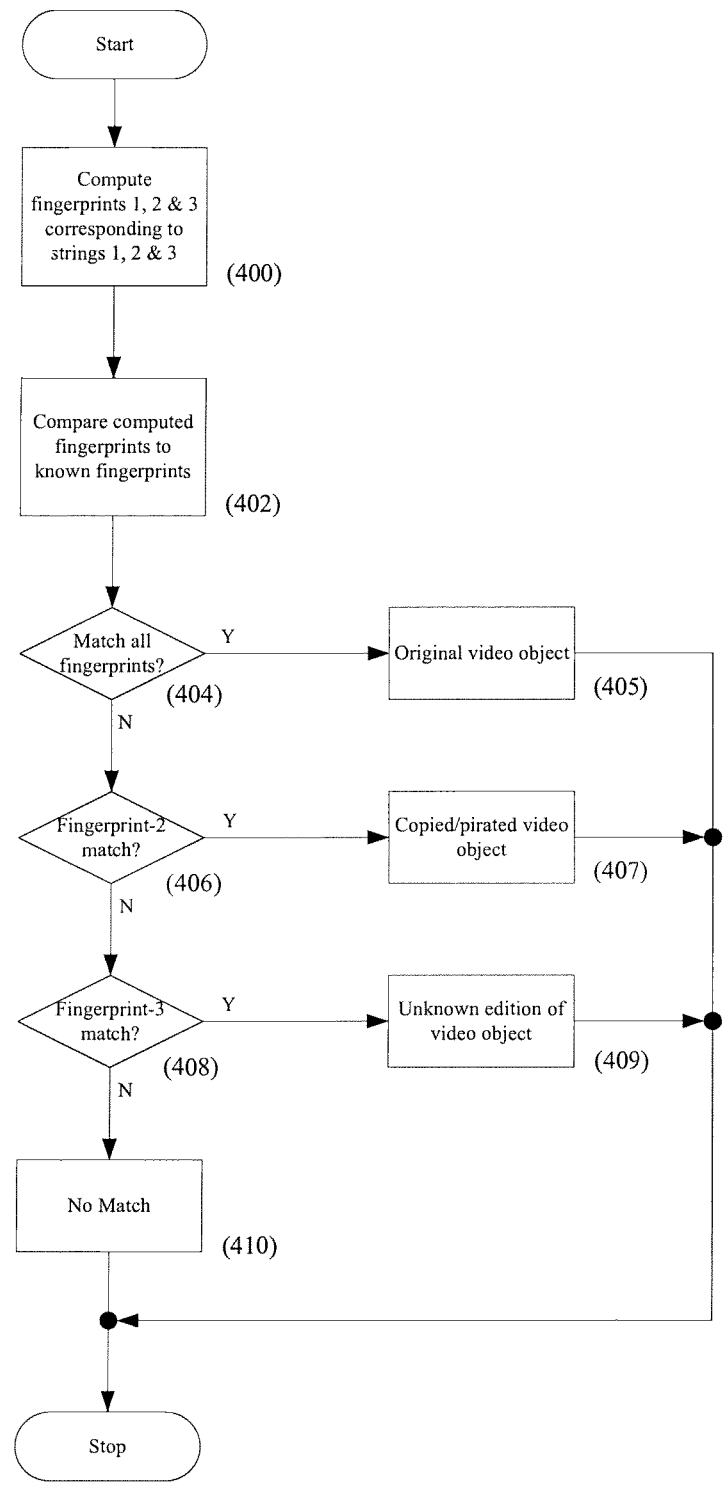
FIG. 4 is a flowchart of database queries that are part of the DVD identification process in a specific embodiment according to present invention.

Certain embodiments provide systems and methods for identifying video objects, including DVD content by computing fingerprints for the video objects and comparing the computed fingerprints to a repository of known fingerprints for video objects. FIG. 3 provides a schematic representing a simplified example of a system according to certain aspects of the invention. In the example, playback devices 33, 34 and 35 can be any device equipped to play a video object including computers 35 such as PC and MAC systems, audio visual equipment such as DVD players and digital video recorders ("DVR") 34 and mobile devices 33 adapted to provide video playback. Computing devices 35 may receive video objects from any available source, including integrated hard drives, DVD, HD-DVD and/or Blu-Ray players as well as streamed video objects received from a network 32.

In certain embodiments, playback devices access known signatures of video objects maintained on one or more databases 30. Some of databases 30 may be maintained by owners of video titles encoded in a video object. Some of databases may be maintained by organizations or groups associated with video titles, manufacturers and providers of video objects and other groups that may wish to provide services associated with video objects.

In one example, a database 30 can contain the known fingerprints of a plurality of DVDs. The database 30 may be accessed using database or other server 31. The fingerprints may be captured at point of manufacture of the DVDs using dedicated fingerprinting computers and servers 36 or may be acquired from information extracted by playback devices 33, 34 and 35.

Referring now also to FIG. 3, a process for identifying a video object is provided. For clarity of discussion purposes, an example of identifying a DVD will be referenced, where the video object for identification is DVD content and identification is sought by one of playback devices 33, 34 or 35. According to certain aspects of the present invention, a DVD identification process commences at step 400 by computing selected fingerprints of the DVD. Typically, fingerprints such as those described in relation to FIGS. 1 and 2 can be calculated by the playback device 33, 34 or 35 together with any other fingerprints that may be used to identify the content, structure and origin of the DVD.

At step 402 the fingerprints computed by the playback device 33, 34 or 35 may be compared to fingerprints identified with known video objects. Comparison can include interrogation of a network database 30. In some embodiments, local storage may be interrogated by playback device 33, 34 or 35 during matching of computed and known fingerprints. The local storage may include a cache of recently matched or frequently matched fingerprints. In some embodiments, a local database 305 may be supported by, for example, playback device 35 to maintain copies of known fingerprints and to assist rapid identification of video objects. In one example, a local DVD database (not shown) could be provided with a DVD player 34 where the local DVD database maintains fingerprints associated with commercially available DVDs. In another example, a DVR may be provided with a database identifying streamed video objects.

If it is determined at step 404 that all of the computed fingerprints match corresponding fingerprints of a known DVD, then the DVD in the playback device 33, 34 or 35 can be identified at step 405 as an original copy of the DVD. In certain embodiments, if less than all fingerprints are determined to be matched at step 404, then other determination of DVD origin may be made. At step 406, for example, if computed and known versions of Fingerprint-2 (see FIG. 1) are matched, then it may be determined at step 407 that a non-original or pirated copy of the DVD has been inserted into the playback device 33, 34 or 35. Similarly, if at step 408, computed and known versions of Fingerprint-3 (see FIG. 1) are matched, then it may be determined at step 409 that a non-original copy of the DVD has been inserted into the playback device 33, 34 or 35 but the copy represents an edition that has not yet been identified to the fingerprint repository. If no fingerprints can be matched, then at step 410, the DVD may be determined to be an original work, an altered version of a known video object.

Additional Descriptions of Certain Aspects of the Invention

Certain embodiments of the invention provide a method of fingerprinting a video object comprising extracting data from the video object, calculating one or more digital fingerprints of the extracted data, and maintaining a copy of the one or more digital fingerprints in association with information identifying the video object, wherein the extracted data includes encoded video, and wherein at least one of the digital fingerprints uniquely identifies a portion of the encoded video. In certain of these embodiments, the video object includes a DVD comprising a plurality of information files. In certain of these embodiments, the one or more digital fingerprints include a first digital fingerprint calculated from the plurality of information files. In certain of these embodiments, the one or more digital fingerprints include a second digital fingerprint calculated from the plurality of information files and additional information identifying operational characteristics of the DVD. In certain of these embodiments, the additional information includes a code identified with Content Scrambling System. In certain of these embodiments, the additional information includes a Regional Protection Code. In certain of these embodiments, the additional information includes Analog Protection System bits. In certain of these embodiments, the identified operational characteristics identify origin of the DVD. In certain of these embodiments, the one or more digital fingerprints identify content, structure and origin of a DVD. Certain of these embodiments also comprise a step of providing the one or more digital fingerprints and information identifying the DVD to a repository of digital fingerprints. In certain of these embodiments, the one or more digital fingerprints identify content and origin of the video object and further comprising providing the one or more digital fingerprints and information identifying the video object to a repository of digital fingerprints.

Certain embodiments comprise a computer readable medium encoded with data and instructions for fingerprinting a video object, the data and instructions causing an apparatus executing the instructions to extract data from the video object, calculate one or more digital fingerprints of the extracted data, and store a copy of the one or more digital fingerprints and information identifying the video object, wherein the extracted data includes encoded video, and wherein at least one of the digital fingerprints uniquely identifies a portion of the encoded video. In certain of these embodiments, the video object includes a DVD comprising a plurality of information files. In certain of these embodiments, the one or more digital fingerprints include a first digital fingerprint calculated from the plurality of information files. In certain of these embodiments, the one or more digital fingerprints include a second digital fingerprint calculated from the plurality of information files and additional information identifying operational characteristics of the DVD. In certain of these embodiments, the additional information includes a code identified with Content Scrambling System. In certain of these embodiments, the additional information includes a Regional Protection Code. In certain of these embodiments, the additional information includes Analog Protection System bits. In certain of these embodiments, the identified operational characteristics identify origin of the DVD. In certain of these embodiments, the one or more digital fingerprints identify content, structure and origin of a DVD. Certain of these embodiments include data and instructions causing an apparatus to provide the one or more digital fingerprints and information identifying the DVD to a repository of digital fingerprints. In certain of these embodiments, the one or more digital fingerprints identify content and origin of the video object. Certain of these embodiments include data and instructions causing an apparatus to provide the one or more digital fingerprints and information identifying the video object to a repository of digital fingerprints.

Certain methods provide a method of identifying a video object comprising extracting data including encoded video from the video object, calculating one or more digital fingerprints based on the extracted data, and matching at least one of the one or more calculated digital fingerprints with corresponding known digital fingerprints of a known video object, wherein a calculated digital fingerprint uniquely identifies a portion of the encoded video. Certain of these embodiments also comprise identifying the video object based on information associated with the corresponding known digital fingerprints. In certain of these embodiments, the video object is identified by matching the calculated digital fingerprint with a corresponding known digital fingerprint of the known video object. In certain of these embodiments, the video object comprises a DVD including a plurality of information files. In certain of these embodiments, the digital fingerprint is calculated from the plurality of information files. In certain of these embodiments, the one or more digital fingerprints include digital fingerprints calculated from the plurality of information files and additional information corresponding to the DVD. In certain of these embodiments, the additional information includes a code identified with a Content Scrambling System. In certain of these embodiments, the additional information includes a Regional Protection Code. In certain of these embodiments, the additional information includes Analog Protection System bits. In certain of these embodiments, the matching includes determining the provenance of the DVD, wherein the DVD is determined to be an original DVD when all of the one or more digital fingerprints are identical to corresponding digital fingerprints of a previously fingerprinted DVD. In certain of these embodiments, a match of fewer than all of the one or more digital fingerprints are identical to corresponding digital fingerprints of the previously fingerprinted DVD is indicative of a copied DVD.

Certain embodiments comprise a computer readable medium encoded with data and instructions for identifying a video object that cause an apparatus to extract data including encoded video from the video object, calculate a plurality of digital fingerprints of the extracted data, and match at least one of the calculated digital fingerprints with corresponding known digital fingerprints of a known video object, wherein one or more of the calculated digital fingerprints uniquely identifies a portion of the encoded video. Certain of these embodiments include data and instructions that can cause an apparatus to identify the video object based on information associated with the corresponding known digital fingerprints. In certain of these embodiments, the video object comprises a DVD including a plurality of information files. In certain of these embodiments, the one or more digital fingerprint is calculated from the plurality of information files. In certain of these embodiments, the one or more digital fingerprints include other digital fingerprints calculated from the plurality of information files and operational information corresponding to the DVD. In certain of these embodiments, the operational information includes a code identified with a Content Scrambling System, a Regional Protection Code and Analog Protection System bits. Certain of these embodiments include data and instructions that can cause an apparatus to determine the origins of the DVD, wherein the DVD is determined to be an original DVD when certain of the one or more digital fingerprints are identical to corresponding digital fingerprints of a previously fingerprinted DVD. In certain of these embodiments, the known digital fingerprints are maintained in a digital fingerprint repository. In certain of these embodiments, the digital fingerprint repository is maintained in a database. In certain of these embodiments, the apparatus is a DVD player. In certain of these embodiments, the apparatus is a computer. In certain of these embodiments, the apparatus is a digital video recorder.

Certain embodiments provide a system for identifying a video object comprising a media player adapted to extract data including encoded video from the video object, and a processor configured to calculate one or more digital fingerprints from the extracted data, and match at least one of the one or more calculated digital fingerprints with corresponding known digital fingerprints of a known video object, wherein at least one calculated digital fingerprint uniquely identifies a portion of the encoded video. In certain of these embodiments, the known digital fingerprints are maintained in a digital fingerprint repository. In certain of these embodiments, the digital fingerprint repository is maintained in a database locally accessible by the processor. In certain of these embodiments, the digital fingerprint repository is maintained in a database accessible by the processor through a network. In certain of these embodiments, the media player is a DVD player. In certain of these embodiments, the media player is a provided in a computer. In certain of these embodiments, the media player is a digital video recorder. In certain of these embodiments, the video object comprises a DVD including a plurality of information files and the one or more digital fingerprints include digital fingerprints calculated from the plurality of information files and operational information corresponding to the DVD.

Certain embodiments provide system for fingerprinting a video object comprising a processor configured to calculate digital fingerprints of data extracted from the video object, and storage accessible to the processor for storing the digital fingerprints in association with information related to the video object, wherein the extracted data includes encoded video, and wherein at least one of the digital fingerprints uniquely identifies a portion of the encoded video with the video object. In certain of these embodiments, the video object is a DVD comprising a plurality of information files. In certain of these embodiments, the digital fingerprints include a first digital fingerprint calculated from the plurality of information files. In certain of these embodiments, the digital fingerprints include a second digital fingerprint calculated from the plurality of information files and additional information identifying operational characteristics of the DVD. In certain of these embodiments, the additional information includes a code identified with Content Scrambling System. In certain of these embodiments, the additional information includes a Regional Protection Code. In certain of these embodiments, the additional information includes Analog Protection System bits. In certain of these embodiments, the identified operational characteristics identify origin of the DVD. In certain of these embodiments, the digital fingerprints identify content, structure and origin of a DVD.

Improvements in the Present Continuation Application

The present continuation application is to extend the DVD to other content mediums including media files and network streams, etc, and extend the video objects to media contents including videos, images and audios.

For comparison, the parent application covers the following key disclosures:

a) Extracting only one fingerprint for each DVD or one media content.
b) The matching result of fingerprint is only for the identification of original, copy or illegal copy of media contents.
c) The media player only has one fingerprint extraction and match operation before processing said video content (to be played), in order to decide whether said video content is permitted to be played.

The present continuation invention continues on from the parent application and extends to disclose:
a) Processing media contents including video or audio contents based on different segments, and extracting multiple fingerprints based on said segments with timestamps of five-second interval, for example, or processing media contents including video or audio contents based on different framerates, and extracting multiple fingerprints based on said framerates, wherein said segments are selected based on complexity of said media contents, and said framerates are determined based on resolution of said media contents.
b) Providing more accurate fingerprint matching results and further processes based on timing of timestamps, including displaying detailed information or advertisement at specific time, replaying or skipping specific segments, masking partial videos or audios, etc.
c) The media player including mobile device is continuously executing fingerprint extraction and match operation before and during playing media contents, and is able to real-timely conduct necessary processes based on match results.
d) Extending the content mediums from physical medium including DVD to virtual medium including blue-ray, file, stream, different AV (audio video) encoded medium, etc.
e) Extending the DVD detection of original content or copy of content to the next level of source detection of detecting the content itself for video or audio programs.
f) Said complexity can be determined by calculating the changes of contents within certain time window or the content elements within certain display window, and said resolution can be calculated based on how many frames within certain time windows.
g) Said complexity means that, within certain time window, more digital fingerprints will be extracted if said media contents change too much, which also means that, when the number of said digital fingerprints is fixed for each said segment, the length of each said segment is shorter if said media contents change faster.

Furthermore, in the parent application, the entire DVD or its complete video object are the main targets to be processed. The original identification method is to ingest then match the entire DVD video content. Based on this method, we can extend it to such a way that the DVD content is disassembled to clips or even image frames, which are then ingested and matched continuously. The method comprises:
a) Disassemble the video object to image frame sequence and audio waveform, and keep record of the corresponding timestamps.
b) Ingest characteristics from image frames and audio waveforms, and integrate the generated characteristics with corresponding timestamps. Due to insignificant differences between adjacent frames, we can pre-process those frames to avoid unnecessary ingestion, and to optimize performance.
c) Store the ingested characteristics together with corresponding timestamps into database.
d) Mark related application data information on timeline according to corresponding image or audio characteristics. Related application data information can be detailed introduction, advertisements and promotions, or play license, etc.
e) Video player (both physical and virtual player) can use the same algorithms to ingest continuous characteristics from decoded images and audio during playback. In order to reduce computing resources for ingestion, we can pre-process the object to be ingested, to avoid unnecessary ingestion, and to optimize performance.
f) Video player sends the ingested characteristics to database for identification. Video player performs characteristics ingestion and sends characteristics to database irregularly based on external conditions, such as when user pauses or switches the video, etc.
g) Upon successful identification, database returns timestamp of the matched content, as well as the previously marked application data information. Application data information can be continuously returned with corresponding timestamps. Database can also send multiple application data information related to the matched timestamp. Application data information will be changed when database receives new characteristics and yields new matches.
h) Video player performs requested operations based on application data information. The requested operations can display detailed information, show advertisements, skip certain clips, or mute certain segments of the audio, etc.
i) Said characteristics may contain key words of the contents, key clips of the contents, selected segments of the contents, critical parts of the contents or compressed version of the contents, defined and configured by owners or authorized users of the media contents.

In summary, the present continuation invention comprises:
A method of fingerprinting media contents comprising:
a) extracting data from said media contents, said extracted data including encoded videos or audios, segments of videos or audios, image frames, audio waveforms and associated timestamps;
b) generating a plurality of digital fingerprints from said extracted data of said media contents;
c) processing said media contents including video or audio contents based on different segments, and extracting multiple fingerprints based on said segments with timestamps, or processing said media contents including video or audio contents based on different framerates, and extracting multiple fingerprints based on said framerates, wherein said segments are selected based on complexity of said media contents, and said framerates are determined based on resolution of said media contents;
d) continuously executing fingerprint extraction and match operation before and during playing said media contents, and being able to real-timely conduct necessary processes based on match results;
e) providing more accurate fingerprint matching results and further processes, based on timing of timestamps, including displaying detailed information or advertisement at specific time; replaying, muting or skipping specific segments; masking partial videos or audios, and
f) maintaining, in a database, a copy of said plurality of digital fingerprints in association with information identifying said media contents.

The aforementioned plurality of digital fingerprints identify content and origin of said media contents and further comprising providing said plurality of digital fingerprints and information identifying said media contents to a repository of digital fingerprints.

The aforementioned media contents are in content mediums from physical medium including DVD (Digital Versatile Disc) to virtual medium including media file, network stream, different AV (audio video) encoded medium.

The aforementioned digital fingerprints can be in the form of single-file fingerprint or multiple pieces of same fingerprint with timestamping in each piece in order to be transmitted over different networks with different connection speeds.

Each said media content may have multiple said fingerprints for said different segments or content parts of said different framerates.

The aforementioned fingerprint extraction improves existing fingerprint generation for video objects comprising disassembling said video object to image frame sequence and audio waveform and keeping record of corresponding timestamps, and ingesting characteristics from image frames and audio waveforms and integrating generated characteristics with said corresponding timestamps.

The aforementioned complexity can be determined by calculating the changes of contents within certain time window, and said resolution can be calculated based on how many frames within certain time windows.

The aforementioned complexity means that, within certain time window, more digital fingerprints will be extracted if said media contents change too much, which also means that, when the number of said digital fingerprints is fixed for each said segment, the length of each said segment is shorter if said media contents change faster.

The method of said fingerprint extraction is privately defined between mobile cloud clients and mobile cloud servers wherein said mobile cloud clients include smartphones, tablets, mobile media players or mobile computers, and said mobile cloud servers include identification server, fingerprints database server or computer server.

The aforementioned plurality of digital fingerprints enable said media contents to be replayed, muted, skipped or replaced with advertisements in any specific timing point when playing said media contents.

A method of identifying media contents comprising:
a) extracting data from said media contents, said extracted data including encoded videos or audios, segments of videos or audios, image frames, audio waveforms and associated timestamps;
b) generating a plurality of digital fingerprints from said extracted data of said media contents;
c) processing said media contents including video or audio contents based on different segments, and extracting multiple fingerprints based on said segments with timestamps, or processing said media contents including video or audio contents based on different framerates, and extracting multiple fingerprints based on said framerates, wherein said segments are selected based on complexity of said media contents, and said framerates are determined based on resolution of said media contents;
d) continuously executing fingerprint extraction and match operation before and during playing said media contents, and being able to real-timely conduct necessary processes based on match results;
e) providing more accurate fingerprint matching results and necessary processes, based on timing of timestamps, including displaying detailed information or advertisement at specific time; replaying, muting or skipping specific segments; masking partial videos or audios;
f) identifying said media contents by matching at least one of the calculated said digital fingerprints with corresponding said digital fingerprints of known media contents, supporting said different segments and said different framerates; and
g) determining whether said media contents are copies of said known media contents as well as conducting said necessary processes based on match results.

The aforementioned identifying media contents is performed in mobile devices, media players, mobile computers or in identification servers.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed:
1. A method of fingerprinting media contents comprising:
a) extracting data from said media contents, said extracted data including encoded videos or audios, segments of videos or audios, image frames, audio waveforms and associated timestamps;
b) generating a plurality of digital fingerprints from said extracted data of said media contents;
c) processing said media contents including video or audio contents based on different segments, and extracting multiple fingerprints based on said segments with timestamps, or processing said media contents including video or audio contents based on different framerates, and extracting multiple fingerprints based on said framerates, wherein said segments are selected based on complexity of said media contents, and said framerates are determined based on resolution of said media contents;
d) continuously executing fingerprint extraction and match operation before and during playing said media contents, and being able to real-timely conduct necessary processes based on match results;
e) providing more accurate fingerprint matching results and further processes, based on timing of timestamps, including displaying detailed information or advertisement at specific time; replaying, muting or skipping specific segments; masking partial videos or audios; and
f) maintaining, in a database, a copy of said plurality of digital fingerprints in association with information identifying said media contents.

2. The method of claim 1, wherein said plurality of digital fingerprints identify content and origin of said media contents and further comprising providing said plurality of digital fingerprints and information identifying said media contents to a repository of digital fingerprints.

3. The method of claim 1, wherein said media contents are in content mediums from physical medium including DVD (Digital Versatile Disc) to virtual medium including media file, network stream, different AV (audio video) encoded medium.

4. The method of claim 1, wherein said digital fingerprints can be in the form of single-file fingerprint or multiple pieces of same fingerprint with timestamping in each piece in order to be transmitted over different networks with different connection speeds.

5. The method of claim 1, wherein each said media content may have multiple said fingerprints for said different segments or content parts of said different framerates.

6. The method of claim 1, wherein said fingerprint extraction improves existing fingerprint generation for video objects comprising disassembling said video object to image frame sequence and audio waveform and keeping record of corresponding timestamps, and ingesting characteristics from image frames and audio waveforms and integrating generated characteristics with said corresponding timestamps.

7. The method of claim 1, wherein said complexity can be determined by calculating the changes of contents within certain time window, and said resolution can be calculated based on how many frames within certain time windows.

8. The method of claim 1, wherein said complexity means that, within certain time window, more digital fingerprints will be extracted if said media contents change too much, which also means that, when the number of said digital fingerprints is fixed for each said segment, the length of each said segment is shorter if said media contents change faster.

9. The method of claim 1, wherein method of said fingerprint extraction is privately defined between mobile cloud clients and mobile cloud servers wherein said mobile cloud clients include smartphones, tablets, mobile media players or mobile computers, and said mobile cloud servers include identification server, fingerprints database server or computer server.

10. The method of claim 1, wherein said plurality of digital fingerprints enable said media contents to be replayed, muted, skipped or replaced with advertisements in any specific timing point when playing said media contents.

11. A method of identifying media contents comprising:
   a) extracting data from said media contents, said extracted data including encoded videos or audios, segments of videos or audios, image frames, audio waveforms and associated timestamps;
   b) generating a plurality of digital fingerprints from said extracted data of said media contents;
   c) processing said media contents including video or audio contents based on different segments, and extracting multiple fingerprints based on said segments with timestamps, or processing said media contents including video or audio contents based on different framerates, and extracting multiple fingerprints based on said framerates, wherein said segments are selected based on complexity of said media contents, and said framerates are determined based on resolution of said media contents;
   d) continuously executing fingerprint extraction and match operation before and during playing said media contents, and being able to real-timely conduct necessary processes based on match results;
   e) providing more accurate fingerprint matching results and necessary processes, based on timing of timestamps, including displaying detailed information or advertisement at specific time; replaying, muting or skipping specific segments; masking partial videos or audios;
   f) identifying said media contents by matching at least one of the calculated said digital fingerprints with corresponding said digital fingerprints of known media contents, supporting said different segments and said different framerates; and
   g) determining whether said media contents are copies of said known media contents as well as conducting said necessary processes based on match results.

12. The method of claim 11, wherein said plurality of digital fingerprints identify content and origin of said media contents and further comprising providing said plurality of digital fingerprints and information identifying said media contents to a repository of digital fingerprints.

13. The method of claim 11, wherein said media contents are in content mediums from physical medium including DVD (Digital Versatile Disc) to virtual medium including media file, network stream, different AV (audio video) encoded medium.

14. The method of claim 11, wherein said digital fingerprints can be in the form of single-file fingerprint or multiple pieces of same fingerprint with timestamping in each piece in order to be transmitted over different networks with different connection speeds.

15. The method of claim 11, wherein each said media content may have multiple said fingerprints for said different segments or content parts of said different framerates.

16. The method of claim 11, wherein said fingerprint extraction improves existing fingerprint generation for video objects comprising disassembling said video object to image frame sequence and audio waveform and keeping record of corresponding timestamps, and ingesting characteristics from image frames and audio waveforms and integrating generated characteristics with said corresponding timestamps.

17. The method of claim 11, wherein said complexity can be determined by calculating the changes of contents within certain time window, and said resolution can be calculated based on how many frames within certain time windows.

18. The method of claim 11, wherein said complexity means that, within certain time window, more digital fingerprints will be extracted if said media contents change too much, which also means that, when the number of said digital fingerprints is fixed for each said segment, the length of each said segment is shorter if said media contents change faster.

19. The method of claim 11, wherein method of said fingerprint extraction is privately defined between mobile cloud clients and mobile cloud servers wherein said mobile cloud clients include smartphones, tablets, mobile media players or mobile computers, and said mobile cloud servers include identification server, fingerprints database server or computer server.

20. The method of claim 11, wherein said identifying media contents is performed in mobile devices, media players, mobile computers or in identification servers.

* * * * *